(12) United States Patent
Li

(10) Patent No.: US 11,019,050 B2
(45) Date of Patent: *May 25, 2021

(54) AUTHENTICATION METHOD AND DEVICE, AND BLOCKCHAIN-BASED AUTHENTICATION DATA PROCESSING METHOD AND DEVICE

(71) Applicant: Advanced New Technologies Co., Ltd., Grand Cayman (KY)

(72) Inventor: Kejia Li, Zhejiang (CN)

(73) Assignee: Advanced New Technologies Co., Ltd., Grand Cayman (KY)

(*) Notice: Subject to any disclaimer, the term of this patent is extended or adjusted under 35 U.S.C. 154(b) by 0 days.

This patent is subject to a terminal disclaimer.

(21) Appl. No.: 16/777,506

(22) Filed: Jan. 30, 2020

(65) Prior Publication Data

US 2020/0169547 A1 May 28, 2020

Related U.S. Application Data

(63) Continuation of application No. 16/552,256, filed on Aug. 27, 2019, which is a continuation of application No. PCT/CN2018/091198, filed on Jun. 14, 2018.

(30) Foreign Application Priority Data

Jun. 19, 2017 (CN) .......................... 201710465995.2

(51) Int. Cl.
*H04L 29/06* (2006.01)
*H04L 9/32* (2006.01)

(52) U.S. Cl.
CPC ............ *H04L 63/08* (2013.01); *H04L 9/3247* (2013.01); *H04L 2209/38* (2013.01)

(58) Field of Classification Search
None
See application file for complete search history.

(56) References Cited

U.S. PATENT DOCUMENTS

2016/0328713 A1 11/2016 Ebrahimi
2016/0330027 A1 11/2016 Ebrahimi
(Continued)

FOREIGN PATENT DOCUMENTS

CN 105701372 A 6/2016
CN 106357644 A 1/2017
(Continued)

OTHER PUBLICATIONS

Extended European Search Report for European Application No. 18821116.3 from the European Patent Office, dated Jan. 22, 2020.
(Continued)

*Primary Examiner* — Kambiz Zand
*Assistant Examiner* — Arezoo Sherkat
(74) *Attorney, Agent, or Firm* — Finnegan, Henderson, Farabow, Garrett & Dunner, LLP

(57) ABSTRACT

An authentication method, includes: receiving an authentication request from a user, the authentication request including an identity identifier of the user; acquiring authentication data associated with the identity identifier from a blockchain network, a blockchain node of the blockchain network storing a mapping relationship between identity identifiers and authentication data; and performing identity authentication for the user according to the authentication data.

17 Claims, 9 Drawing Sheets

(56) References Cited

U.S. PATENT DOCUMENTS

| | | |
|---|---|---|
| 2016/0330035 A1 | 11/2016 | Ebrahimi et al. |
| 2017/0076286 A1 | 3/2017 | Castinado et al. |
| 2017/0078299 A1 | 3/2017 | Castinado et al. |
| 2017/0177855 A1* | 6/2017 | Costa Faidella ...... H04L 9/3236 |
| 2017/0257358 A1* | 9/2017 | Ebrahimi .............. H04L 9/3247 |
| 2018/0063099 A1* | 3/2018 | Versteeg ............... H04L 9/3247 |
| 2018/0196694 A1* | 7/2018 | Banerjee ............. G06F 13/1642 |
| 2018/0293363 A1* | 10/2018 | Asati ........................ G06F 21/64 |
| 2018/0294977 A1* | 10/2018 | Uhr .................. G06Q 20/38215 |
| 2019/0005470 A1* | 1/2019 | Uhr ..................... G06Q 20/401 |
| 2019/0295162 A1* | 9/2019 | Wang ................... H04L 9/0866 |
| 2019/0333058 A1* | 10/2019 | Hong ................ G06Q 20/3829 |
| 2019/0372781 A1* | 12/2019 | Ra ......................... H04L 9/3239 |
| 2019/0372786 A1* | 12/2019 | Ra ............................ G06F 21/30 |
| 2020/0036707 A1* | 1/2020 | Callahan ................. G06F 21/35 |
| 2020/0051074 A1* | 2/2020 | Suh .................... G06Q 20/4018 |
| 2020/0092102 A1* | 3/2020 | Wang ................... H04W 12/06 |

FOREIGN PATENT DOCUMENTS

| | | |
|---|---|---|
| CN | 106411901 A | 2/2017 |
| CN | 106411950 A | 2/2017 |
| CN | 106533696 A | 3/2017 |
| CN | 106789911 A | 5/2017 |
| JP | 2012178111 A | 9/2012 |
| JP | 2018516030 A | 6/2018 |
| WO | WO-2018223125 A1 * 12/2018 ........... H04L 9/3239 |

OTHER PUBLICATIONS

Written Opinion in Application No. 11201906764Q, issued by the Intellectual Property Office of Singapore dated May 18, 2020.
International Search Report in Application No. PCT/CN2018/091198, dated Aug. 21, 2018.
Office Action of Japanese Application No. 2019-540336, dated Jan. 5, 2021.

* cited by examiner

100

101

Receiving Identity Information Sent From a User, and Authenticating the Identity Information

102

Generating First Authentication Data According to the Authentication Result, the First Authentication Data Including the Authentication Result, an Institution Identifier of an Institution That Generates the Authentication Result, and an Identity Identifier of the User

103

Storing the First Authentication Data to a Blockchain Node of a Blockchain Network

Generating Authentication Data According to an Authentication Result, the Authentication Data Including an Identity Identifier of a User, an Institution Identifier of an Institution That Generates the Authentication Result, and the Authentication Result, the Authentication Result Indicating Authentication Being Successful/Authentication Failed

405

Storing the Authentication Data to a Blockchain Node of the Blockchain Network

Acquiring, According to a Service Type of a Service Requested by a User, Identity Feature Information of the User Associated With the Service Type From an Identity Information Management Server

505

Generating Authentication Data According to an Authentication Result and the Identity Feature Information, the Authentication Data Including an Identity Identifier of the User, an Institution Identifier of an Institution That Generates the Authentication Result, an Authentication Event of Authenticating the Identity Feature Information, and the Authentication Result, the Authentication Result Indicating Authentication Being Successful/Authentication Failed

506

Storing the Authentication Data to a Blockchain Node of the Blockchain Network

*FIG. 5*

AUTHENTICATION METHOD AND DEVICE, AND BLOCKCHAIN-BASED AUTHENTICATION DATA PROCESSING METHOD AND DEVICE

CROSS-REFERENCE TO RELATED APPLICATION

This application is a continuation application of U.S. application No. 16/552,256, filed on Aug. 27, 2019, which is a continuation application of International Application No. PCT/CN2018/091198, filed on Jun. 14, 2018, which is based upon and claims priority to Chinese Application No. 201710465995.2, filed on Jun. 19, 2017, the contents of all of which are incorporated herein by reference in their entireties.

TECHNICAL FIELD

The present disclosure generally relates to the field of Internet information processing technologies and computer technologies, and more particularly to authentication methods and devices, and blockchain-based authentication data processing methods and devices.

TECHNICAL BACKGROUND

With the development of the Internet technologies, more and more industries use the Internet to provide services for users. Identity authentication is an important element in the process of providing services through the Internet. A server corresponding to an Internet service platform generally authenticates the identity of a user requesting a service by using the following methods.

A data link is established in advance between a server (hereinafter referred to as a first server) corresponding to the Internet service platform and a server (hereinafter referred to as a second server) corresponding to an identity management platform (for example, a public security agency or other government agencies). When receiving a service request sent from a user, the first server generates an authentication request according to identity information the user included in the service request (the identity information may include information such as an identity identifier), and sends the authentication request to the second server via the data link established in advance. The second server receives the authentication request sent from the first server, authenticates the identity information included in the authentication request, and sends the authentication result to the first server. When receiving the authentication result, the first server completes the identity authentication for the user according to the authentication result.

Because various Internet service platforms can acquire users' identity information, leakage of users' identity information may occur. To prevent leakage of identity information, a user can use the identity information to apply to the second server for an electronic identity (eID). In this way, when requesting a service, the user may send the eID to the first server, and the first server can perform identity authentication for the user by using the above described method.

However, the identity authentication performed by each Internet service platform for the user requires the involvement of the second server. The second server needs to process a large number of authentication requests, leading to low efficiency in processing authentication requests, and a longer time required for the Internet service platform to process the requested service. As a result, user experience of the service provided by the Internet service platform is poor.

SUMMARY

In view of the above, embodiments of the specification provide authentication methods and devices, and blockchain-based authentication data processing methods and devices, to solve the problem of low processing efficiency of existing identity authentication methods.

In one aspect, an authentication method includes: receiving an authentication request sent from a user, where the authentication request includes an identity identifier of the user; acquiring authentication data associated with the identity identifier from a blockchain network, where a blockchain node of the blockchain network stores a mapping relationship between identity identifiers and authentication data; and performing identity authentication for the user according to the authentication data.

In another aspect, a blockchain-based authentication data processing method includes: receiving identity information sent from a user, and authenticating the identity information; generating first authentication data according to the authentication result, where the first authentication data includes the authentication result, an institution identifier of an institution that generates the authentication result, and an identity identifier of the user; and storing the first authentication data to a blockchain node of a blockchain network.

In still another aspect, an authentication device includes: a receiving unit configured to receive an authentication request sent from a user, where the authentication request includes an identity identifier of the user; an acquiring unit configured to acquire authentication data associated with the identity identifier from a blockchain network, where a blockchain node of the blockchain network stores a mapping relationship between identity identifiers and authentication data; and an authentication configured to perform identity authentication for the user according to the authentication data.

In still another aspect, a blockchain-based authentication data processing device includes: a receiving unit configured to receive identity information sent from a user, and authenticate the identity information; a processing unit configured to generate first authentication data according to the authentication result, where the first authentication data includes the authentication result, an institution identifier of an institution that generates the authentication result, and an identity identifier of the user; and a storage unit configured to store the first authentication data to a blockchain node of a blockchain network.

In yet another aspect, an authentication device includes at least one memory and at least one processor, where the at least one memory stores a program and the processor is configured to: receive an authentication request sent from a user, where the authentication request includes an identity identifier of the user; acquire authentication data associated with the identity identifier from a blockchain network, where a blockchain node of the blockchain network stores a mapping relationship between identity identifiers and authentication data; and perform identity authentication for the user according to the authentication data.

In yet another aspect, a blockchain-based authentication data processing device includes at least one memory and at least one processor, where the at least one memory stores a program and the processor is configured to: receive identity information sent from a user, and authenticating the identity information; generate first authentication data according to the authentication result, where the first authentication data includes the authentication result, an institution identifier of an institution that generates the authentication result, and an identity identifier of the user; and store the first authentication data to a blockchain node of a blockchain network.

The technical solutions adopted by the embodiments of the specification can achieve the following beneficial effects. With the technical solutions provided herein, after an authentication request sent from a user is received, authentication data associated with an identity identifier of the user can be acquired from a blockchain network identity authentication can be performed for the user according to the authentication data. In this way, based on the features such as decentralization and anti-tampering of the blockchain network, a mapping relationship between identity identifiers of different users and authentication data can be stored in advance in a blockchain node of the blockchain network. When providing a service for the user, an Internet service platform can perform identity authentication for the user based on the authentication data stored in the blockchain network.

The technical solutions can therefore avoid the problem of low efficiency in processing authentication requests due to the large number of identity authentication requests to be processed by the identity management platform, thus improving the processing efficiency of identity authentication. As the authentication data can be shared among different Internet service platforms by means of the blockchain network, the user does not need to submit identity information when registering with or logging in to a new service platform each time. Misuse of the identity information by an imposter due to leakage of the identity information can be effectively prevented, thus effectively improving the accuracy of identity authentication.

BRIEF DESCRIPTION OF THE DRAWINGS

The accompanying drawings described herein are provided for further comprehension of the specification and constitute a part of the present application. The embodiments of the specification and the description thereof are used for illustration purposes. They do not constitute any improper limitation on the scope of to the specification.

FIG. 1 is a flowchart of a blockchain-based authentication data processing method according to an embodiment.

FIG. 4 is a flowchart of an authentication method according to an embodiment

FIG. 5 is a flowchart of an authentication method according to an embodiment.

DETAILED DESCRIPTION

Figure 2:
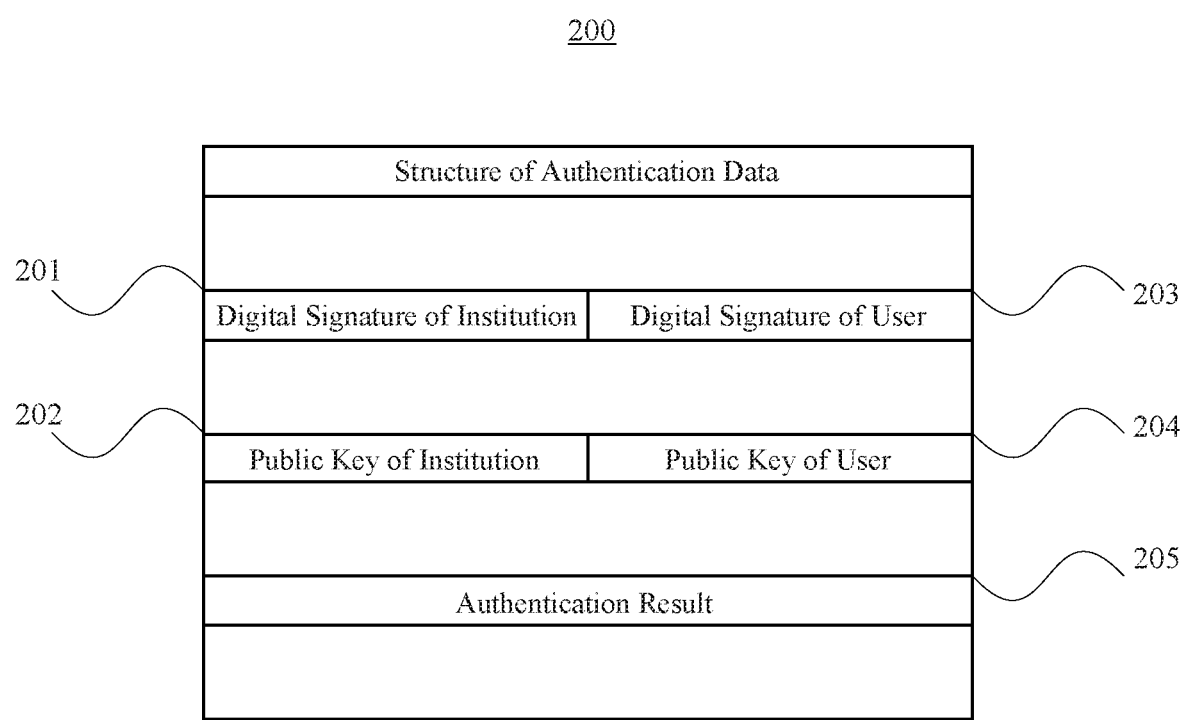
FIG. 2 is a schematic diagram authentication data in a blockchain network according to an embodiment.

Embodiments of the specification provide authentication methods and devices, and blockchain-based authentication data processing methods and devices. According to an embodiment, after an authentication request sent from a user is received, authentication data associated with an identity identifier of the user is acquired from a blockchain network, and identity authentication is performed for the user according to the authentication data.

Based on the features such as decentralization and anti-tampering of the blockchain network, a mapping relationship between identity identifiers of different users and authentication data can be stored in advance in a blockchain node of the blockchain network. When providing a service for the user, an Internet service platform can perform identity authentication for the user based on the authentication data stored in the blockchain network. The technical solutions provided herein can avoid the problem of low efficiency in processing authentication requests due to the large number of identity authentication requests to be processed by the identity management platform, thus improving the processing efficiency of identity authentication. As the authentication data can be shared among different Internet service platforms by means of the blockchain network, the user does not need to submit identity information when registering with or logging in to a new service platform each time. Misuse of the identity information by an imposter due to leakage identity information can be effectively prevented, thus effectively improving the accuracy of identity authentication.

In an embodiment, the mapping relationship may be stored by a server corresponding to an identity management platform when the user registers with the server. Alternatively and/or additionally, the mapping relationship may be stored by Internet service platform providing services when the user requests a service from the Internet service platform The specific manners are not limited herein.

Technical solutions of the specification and the advantages thereof will be described in detail in the following with reference to exemplary embodiments and the corresponding accompanying drawings. It is appreciated that the described embodiments are only exemplary embodiments of the present disclosure. All other embodiments obtained by a person of ordinary skill in the art based on the embodiments of the present disclosure belong to the protective scope of the present disclosure.

FIG. 1 is a flowchart of a blockchain-based authentication data processing method 100 according to an embodiment. The method 100 can be executed by a server corresponding to an identity management platform. As shown in FIG. 1, the method 100 can include the following steps.

In step 101: receiving identity information sent from a user, and authenticating the identity information.

In an embodiment, the server corresponding to the identity management platform may be a residence registration management server of a public security agency, or may be a server corresponding to a financial institution. That means, the identity authentication performed by the server corresponding to the identity management platform is credible.

In an embodiment, the server corresponding to the identity management platform may receive the identity information sent from the user during a registration process. The server may also receive the identity information sent from the user when the user initiates a service, for example, a deposit service, a withdrawal service, a transfer service, etc. In these cases, the server corresponding to the identity management platform may need to authenticate the received identity information.

The identity information can include various identity feature information such as the name, age, identity card number, and bank card number of the user. The server corresponding to the identity management platform may authenticate the received identity information based on stored identity feature information of the user, to determine whether the identity information is valid.

For example, the server corresponding to the identity management platform can be a server corresponding to a financial institution. The user provides the identity information to the server corresponding to the financial institution when opening an account. In that case, the server corresponding to the financial institution may authenticate the identity information provided by the user. When determining that the identity information of the user is valid, bank account information can be assigned to the user, and a mapping relationship can be established between bank account information of the user (for example, bank card number) and identity information of the user.

In an embodiment, when determining that the identity information is valid after authenticating the identity information, the server corresponding to the identity management platform may further generate an identity identifier for the user. The identity identifier can uniquely identify the user. For example, the identity identifier may be an eID, or may be in other forms, which is not limited herein.

In step 102: generating first authentication data according to the authentication result, the first authentication data including, e.g., the authentication result, an institution identifier of an institution that generates the authentication result, and an identity identifier of the user.

In an embodiment, the authentication result may show that authentication is successful, indicating that the identity information of the user is valid; or that authentication failed, indicating that the identity information of the user is abnormal or invalid.

Authentication data may be generated based on the obtained authentication result, whether or not the authentication is successful. It is appreciated that "first," "second," and "third" used in "first authentication data" and the following "second authentication data" and "third authentication data" do not have special meanings and are only used for distinguishing different authentication data.

When the verification result indicates that the identity information is valid, the first authentication data can be obtained according to the authentication result, the institution identifier of the institution that generates the authentication result, and the identity identifier of the user. If the first authentication data is acquired subsequently, the server corresponding to the Internet service platform may determine according to the first authentication data whether the identity information of the user is valid. Therefore, processing efficiency of authentication can be improved.

When the authentication result indicates that the identity information is abnormal or invalid, third authentication data may be obtained according to the authentication result, the institution identifier of the institution that generates the authentication result, and the identity identifier of the user.

In an embodiment, an authentication level may be determined for the server corresponding to the identity management platform. That is, authentication results determined by servers corresponding to different identity management platforms may have different authentication levels. The authentication levels can correspond to different levels of credibility or reliability. The higher the authentication level, the higher the credibility level corresponding to the determined authentication result. Conversely, the lower the authentication level, the lower the credibility level corresponding to the determined authentication result. Because the authentication data includes the institution identifier of the institution that generates the authentication result, the credibility level of the authentication result generated by the institution identifier may be determined according to a mapping relationship between the institution identifier and the authentication level. Therefore, the accuracy of identity authentication can be improved.

In step 103: storing the first authentication data to a blockchain node of a blockchain network.

In an embodiment, the server corresponding to the identity management platform may serve as a blockchain node in the blockchain network, or may serve as a device independent of the blockchain network, which is not limited herein.

If the server corresponding to the identity management platform is a blockchain node in the blockchain network, after obtaining authentication data (for example, the first authentication data or the third authentication data), the server may broadcast the authentication data to other blockchain nodes in the blockchain network. That way, the other blockchain nodes can perform consensus processing on the authentication data. When the consensus processing result indicates that consensus authentication is passed or a consensus is reached, the server corresponding to the identity management platform can store the authentication data to a newly generated block, and store the block to a blockchain node of the blockchain network.

If the server corresponding to the identity management platform is a device independent of the blockchain network, after obtaining authentication data (for example, the first authentication data or the third authentication data), the server may send the authentication data to any blockchain node in the blockchain network. The blockchain node can broadcast the authentication data to other blockchain nodes in the blockchain network, so that the other blockchain nodes can perform consensus processing on the authentication data. When the consensus processing result indicates that consensus authentication is passed or that a consensus is reached, the blockchain node can store the first authentication data to a newly generated block, and store the block to a blockchain node of the blockchain network.

To ensure security of the identity information, in an embodiment of the specification, the authentication result may be stored in the blockchain network, and the identity information may be stored in an identity information database, to prevent leakage of the identity information. The identity information database may not be located in the blockchain network. In an embodiment, the identity information may be stored in the server corresponding to the identity management platform.

In an embodiment, a mapping relationship can be established between identity identifiers of the users and identity information of the users. The identity information of the users can be stored to the identity information database, according to the mapping relationship.

In an embodiment, the status of some identity feature information in the identity information of the user may change due to some external factors. For example, the status of the identity card number of the user may change from a normal state to a lost state due to the loss of the identity card of the user. The server corresponding to the identity management platform can generate different authentication data depending on different situations, to ensure that the authentication result is consistent with the actual situation of the identity information of the user.

For example, a loss report or unregistration request sent from the user may be received. The loss report or unregistration request can include the identity identifier of the user.

It can be determined according to the loss report or unregistration request that the identity information of the user is in an abnormal state. Second authentication data can be generated according to the identity information of the user being in an abnormal state, the institution identifier of the institution that generates the authentication result, and the identity identifier of the user. The second authentication data can be stored to a blockchain node of the blockchain network.

Accordingly, once receiving a change request sent from the user (including, e.g., a loss report request, an unregistration request, a resume request, etc.), the server corresponding to the identity management platform can determine a current status of the identity information of the user according to the change request. The server can generate the second authentication data according to the current status of the identity information of the user, the institution identifier of the institution that generates the authentication result, and the identity identifier of the user.

Similarly, when the second authentication data is stored to a blockchain node of the blockchain network, consensus processing on the second authentication data may be initiated. The manner of consensus processing can be the same as or similar to that of consensus processing on the first authentication data. Reference may be made to the description above, and the details will not be repeated herein.

It should be appreciated that the servers corresponding to the identity management platforms described herein may serve as blockchain nodes in a consortium blockchain. Authentication data generated by the servers can be used by other servers that recognize the consortium blockchain, thus effectively improving the processing efficiency of identity authentication.

In an embodiment, to ensure the security of the authentication data stored in the blockchain, the authentication data may be stored according to a preset format.

FIG. 2 is a schematic diagram of an authentication data structure 200 in a blockchain network according to an embodiment. The authentication data structure 200 can include a digital signature of institution element 201, a public key of institution element 202, a digital signature of user element 203, a public key of user element 204, and an authentication result 205.

In some embodiments, the institution identifier of the institution that generates the authentication result may be represented by using a public key and a digital signature. Public and private key pairs may be set for different institutions in advance. A digest corresponding to the institution identifier may be encrypted by using the private key to obtain the digital signature. In the authentication data, the public key and the digital signature can be used as institution information of the institution generating the authentication result.

In some embodiments, the identity identifier of the user may also be represented by using a public key and a digital signature. For example, a public and private key pair may be set for the user in advance. After the identity information of the user is authenticated, a digest corresponding to the identity information of the user may be encrypted by using the private key to obtain the digital signature. In the authentication data, the public key and the digital signature can be used as the identity identifier of the user.

In an embodiment, the authentication data stored in a blockchain node of the blockchain network may be stored in a form shown below in Table 1.

TABLE 1

| Time | User identifier | | Institution identifier | | Authentication result |
|------|----------------|---|------------------------|---|----------------------|
| T1 | Public key | Digital signature | Public key | Digital signature | Successful/Failed |

Figure 3:
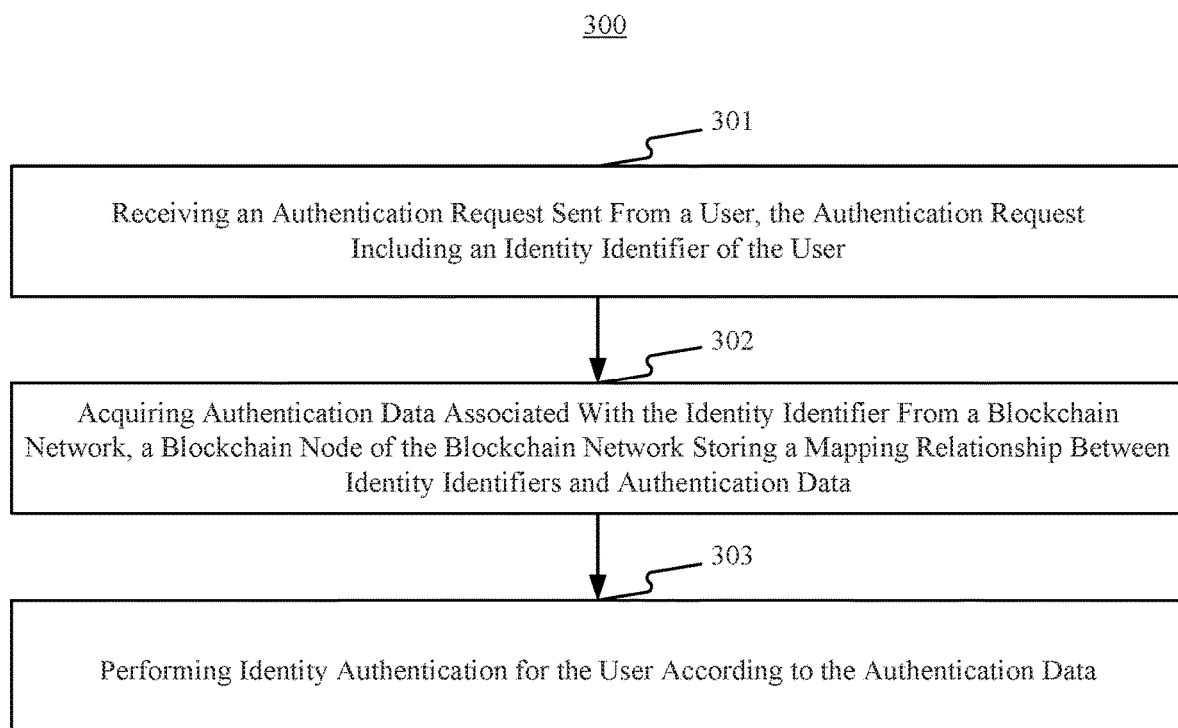
FIG. 3 is a flowchart of an authentication method according to an embodiment.

FIG. 3 is a flowchart of an authentication method 300 according to an embodiment. The authentication method 300 may be executed by a server corresponding to an Internet service platform providing services, or an application client running in the form of an APP on a terminal device, which is not limited herein. As shown in FIG. 3, the authentication method 300 can include the following steps.

In step 301: receiving an authentication request sent from a user, the authentication request including an identity identifier of the user.

In an embodiment, the authentication request sent from the user may be sent by the user when sending a service processing request or may be sent by the user when logging in to an Internet service platform, which is not limited herein.

The identity identifier can uniquely identify the user. The identity identifier may be a login account of the user, an eID, or in another form, which is not limited herein.

In step 302: acquiring authentication data associated with the identity identifier from a blockchain network, a blockchain node of the blockchain network storing a mapping relationship between identity identifiers and authentication data.

In an embodiment, a blockchain node of the blockchain network may store the mapping relationship between identity identifiers and authentication data. When the authentication request sent from the user is received, the authentication data associated with the identity identifier may be acquired from the blockchain network, based on the identity identifier of the user included in the authentication request and the mapping relationship stored in the blockchain node.

In an embodiment, before the authentication data associated with the identity identifier is acquired, if the authentication request further includes a public key and a digital signature, it can be verified whether the digital signature is valid by using the public key. As mentioned above, the digital signature can be obtained using the private key in the public and private key pair. The signature verification process can determine whether the user sending the authentication request is the user for whom the public and private key pair is set, and thus determine the necessity of performing subsequent processes.

If the verification result indicates that the digital signature is invalid, the authentication process can be ended.

If the verification result indicates that the digital signature is valid, the authentication data associated with the identity identifier can be acquired from the blockchain network.

Because each blockchain node of the blockchain network may store a plurality of pieces of authentication data, in an embodiment, the authentication data including the identity identifier can be obtained/selected based on the identity identifier included in the authentication request. The obtained authentication data can be determined to be the authentication data associated with the identity identifier.

Further, if more than one piece of authentication data is obtained that includes the identity identifier, authentication data satisfying a preset condition can be selected from the obtained authentication data. The selected authentication data can be determined as the authentication data associated with the identity identifier.

In an embodiment, the preset condition can include one or more of the following: a generation time of the authentication data satisfies a preset time condition; an institution identifier included in the authentication data satisfies a preset issuing institution's institution identifier; or a service type included in the authentication data is the same as a service type of a service initiated by the user.

For example, if the preset condition is that the generation time of the authentication data satisfies the preset time condition, generation times of the pieces of authentication data obtained can be determined. The authentication data corresponding to the generation time satisfying the preset time condition can be selected based on the generation times of the pieces of authentication data. The selected authentication data can be determined as the authentication data associated with the identity identifier.

In an embodiment, the preset time condition can be that a time difference between the generation time of the authentication data and a current time is the smallest. After the generation times of the pieces of the obtained authentication data are determined, the pieces of authentication data can be sorted in a chronological order. The authentication data corresponding to the generation time that is closest to the current time is selected according to the sorting result. That piece of authentication data can be determined as the authentication data associated with the identity identifier.

The generation time of the authentication data may be the time at which the authentication result is generated. Alternatively, the generation time may also be the time at which the authentication data is stored to a blockchain node of the blockchain network, or the time at which the blockchain node of the blockchain network accepts the authentication data, which is not limited herein.

In an embodiment, the preset condition can be that the institution identifier included in the authentication data satisfies a preset issuing institution's institution identifier. Institution identifiers corresponding to the pieces of the obtained authentication data can be determined. The piece of authentication data in which the institution identifier satisfies/matches the preset issuing institution's institution identifier can be selected. The selected piece of authentication data can be determined as the authentication data associated with the identity identifier.

For example, the preset issuing institution's institution identifier is 10000. After the institution identifiers corresponding to the pieces of obtained authentication data are determined, the authentication data in which the institution identifier is 10000 can be determined as the authentication data associated with the identity identifier.

It is appreciated that the institution identifier may be in the form of a character string, or may be a public key and a digital signature. If the institution identifier is a public key and a digital signature, public keys of institutions corresponding to the pieces of obtained. authentication data can be determined. The authentication data in which the public key satisfies/matches the preset issuing institution's public key can be selected. The selected authentication data can be determined as the authentication data associated with the identity identifier.

In an embodiment, there may be more than one piece of authentication data in which the institution identifiers satisfy the preset issuing institutions institution identifier. If the number is more than one, authentication data including an institution identifier corresponding to an institution having the highest authentication level may be acquired, based on authentication levels of the issuing institutions. If the authentication data including the institution identifier corresponding to the institution having the highest authentication level is not found, authentication data including an institution identifier corresponding to an institution having the second highest authentication level can be acquired. In this way, the authenticity and validity of the authentication data can be ensured, thus ensuring the accuracy of the authentication result.

In an embodiment, the preset condition is that the service type included in the authentication data is the same as the service type of the service initiated by the user. In that case, the service type of the service initiated by the user can be determined, service types included in the pieces of obtained authentication data can also be determined. Authentication data including a service type that is the same as the service type of the service initiated by the user can be selected, according the service types included in the pieces of authentication data. The selected authentication data can be determined as the authentication data as with the identity identifier.

Services of the same service type may have similar requirements on the identity authentication of the user. Identity authentication according to authentication data generated by other Internet service platforms providing same/similar services can help ensure the accuracy of the authentication result.

It should be appreciated that, during the screening process of the authentication data, the three preset conditions described above may be used either separately or in combination, which is not limited herein. In addition to the above three preset conditions, other conditions may also be set as required, which will not be enumerated herein.

In step 303: performing identity authentication for the user according to the authentication data.

In an embodiment, a current authentication status of the identity identifier can be determined according to the authentication data. If the identity identifier is in an abnormal state and/or an authentication failed state, it can be determined that the identity authentication for the user is riot successful. If the identity identifier is not in an abnormal state or an authentication failed state, it can be determined that the identity authentication for the user is successful. In an embodiment, the abnormal state described may be a lost state or may be an unregistered state, which is not limited herein.

In the process of determining the current authentication status of the identity identifier according to the authentication data, once it is determined that the authentication data of the identity identifier has experienced an abnormal state, it can be further determined whether the authentication status of the identity identifier recovers from the abnormal state. If there is no recovery from the abnormal state, it can be determined that the identity identifier is in an abnormal state. If there is recovery from the abnormal state, it can be determined that the identity identifier is in a normal state.

For example, when the identity identifier is lost or leaked, the user can send a change request to the server corresponding to the identity management platform, to report loss of the identity identifier or to update the identity identifier. The server corresponding to the identity management platform can send information indicating the loss report or update to the blockchain network through the identity management platform. The server can further upload the loss or update information to the blockchain network after consensus authentication is successful.

In an embodiment, the user can directly send an unregistration request to an identity management institution. The server corresponding to the identity management platform can upload the unregistration information to the blockchain through the identity management platform.

The authentication methods provided in the embodiments of the specification integrate the blockchain technology, benefiting from the advantages of the blockchain technology. The technical solutions also have the following advantages. The authentication process does not involve the identity information of the user. The authentication process is completed by using only the identity identifier, thus preventing the identity information from being acquired by a blockchain node or entities other than the blockchain node, thereby enhancing the security of the identity information. Further, in practical applications, any user can check/obtain the authentication status of his/her identity identifier by using a user client terminal or by submitting an application to a related service institution, to determine whether the identity identifier is misused by an imposter. Therefore, the user can monitor and take actions as soon as possible once finding that the identity identifier is misused by an imposter.

In addition, the authentication process may be executed by a blockchain node or another entity unrelated to the blockchain node. The authentication data stored in the blockchain can be written or updated only by the blockchain node. Therefore, when the user or a regulatory authority finds that the identity identifier is misused by an imposter, tracking can be performed.

With the technical solutions provided in the embodiments of the specification, after an authentication request sent from a user is received, authentication data associated with an identity identifier of the user can be acquired from a blockchain network, and identity authentication can be performed for the user according to the authentication data. Based on the features such as decentralization and anti-tampering of the blockchain network, a mapping relationship between identity identifiers of different users and authentication data can be stored in advance in a blockchain node of the blockchain network. When providing a service for the user, an Internet service platform can perform identity authentication for the user based on the authentication data stored in the blockchain network.

The technical solutions provided herein can avoid the problem of low efficiency in processing authentication requests due to the large number of identity authentication requests to be processed by the identity management platform, thus improving the processing efficiency of identity authentication. As the authentication data can be shared among different Internet service platforms by means of the blockchain network, the user does not need to submit identity information when registering with or logging in to a new service platform each time. Misuse of the identity information by an imposter due to leakage of the identity information can be effectively prevented, thus effectively improving the accuracy of identity authentication.

FIG. 4 is a flowchart of an authentication method 400 according to an embodiment. The authentication method 400 can be performed in combination with the steps as described in FIG. 3. As shown in FIG. 4, the authentication method 400 can include the following steps.

In step 404: generating authentication data according to an authentication result, the authentication data including an identity identifier of a user, an institution identifier of an institution that generates the authentication result, and the authentication result, and the authentication result includes authentication being successful/authentication failed.

In step 405: storing the authentication data to a blockchain node of the blockchain network.

In an embodiment, before the storing the authentication data to a blockchain node of the blockchain network, the authentication method 400 can further include: sending the authentication data to the blockchain network, so that the blockchain network performs consensus processing on the authentication data; and if the consensus processing result indicates that a consensus is reached, storing the authentication data to the blockchain node of the blockchain network.

FIG. 5 is a flowchart of an authentication method 500 according to an embodiment. The authentication method 500 can be performed in combination with the steps as described in FIG. 3. As shown in FIG. 5, the authentication method 500 can include the following steps.

In step 504: acquiring, according to a service type of a service requested by a user, identity feature information of the user associated with the service type from an identity information management server.

In some embodiments, some service procedures may require the use of the identity information of the user. For example, a game service platform may acquire user identity information such as gender and age, and a community management platform may acquire user identity information such as address, registered permanent residence, phone number, and family members of the user.

In these cases, the server corresponding to the Internet service platform may acquire the identity feature information of the user associated with the service type from the identity information management server and authenticate the acquired identity feature information. The identity feature information can include information about gender, age, user's address, registered permanent residence, phone number, family members, and the like.

For example, the server corresponding to the Internet service platform can send a user identity information acquiring request to the identity information management server.

After receiving the user identity information acquiring request, the identity information management server can check whether the server corresponding to the Internet service platform has permission to acquire the identity information of the user. For example, the identity information management server can check whether there is a valid authorization agreement between the server corresponding to the Internet service platform and the user, and whether the current user identity information acquiring request is authorized by the user.

It should be appreciated that there may be a plurality of identity information management servers. For example, the identity feature information about phone number and the identity feature information about age may be stored in different identity information management servers.

Then, the server corresponding to the Internet service platform receives the identity feature information returned from the identity information management server.

In step 505: generating authentication data according to an authentication result and the identity feature information, the authentication data including, e.g., an identity identifier of the user, an institution identifier of an institution that generates the authentication result, an authentication event of authenticating the identity feature information, and the authentication result, the authentication result indicating authentication being successful/authentication failed.

It is appreciated that the authentication event of authenticating the identity feature information can be used to indicate that one or more pieces of acquired identity feature information of the user are authenticated. The authentication data may not include specific contents of the identity feature information, thus ensuring the security of the identity feature information and reducing the risk of leakage.

In step 506: storing the authentication data to a blockchain node of the blockchain network.

In an embodiment, before the storing the authentication data to a blockchain node of the blockchain network, the authentication method 500 can further include: sending the authentication data to the blockchain network, so that the blockchain network performs consensus processing on the authentication data; and if the consensus processing result indicates that a consensus is reached, storing the authentication data to a blockchain node of the blockchain network.

Figure 6:
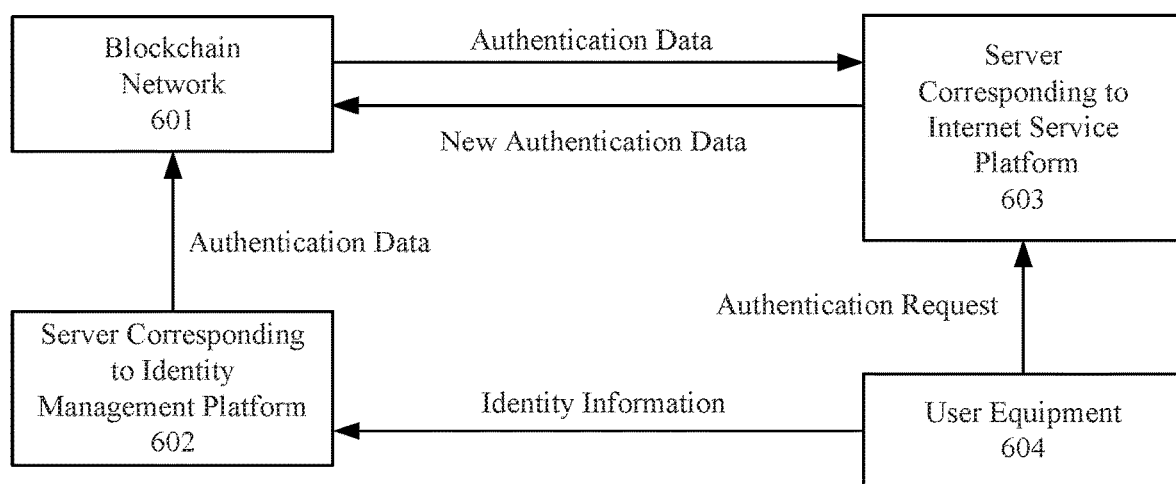
FIG. 6 is a diagram of an identity authentication system according to an embodiment.

FIG. 6 is a schematic diagram of an identity authentication system 600 according to an embodiment. As shown in FIG. 6, the identity authentication system 600 includes a blockchain network 601, a server 602 corresponding to an identity management platform, a server 603 corresponding to an Internet service platform, and user equipment 604.

In one embodiment, the user uses the user equipment 604 to send identity information to the server 602 corresponding to the identity management platform. The server 602 corresponding to the identity management platform authenticates the identity of the user, and stores authentication data including an authentication result to the blockchain network 601.

When providing a service for the user, the server 603 corresponding to the Internet service platform nay acquire the authentication data from the blockchain network 601, and perform the identity authentication for the user. In addition, the generated authentication result may also be stored to the blockchain network 601, so that the authentication result can be shared with other Internet service platforms.

Figure 7:
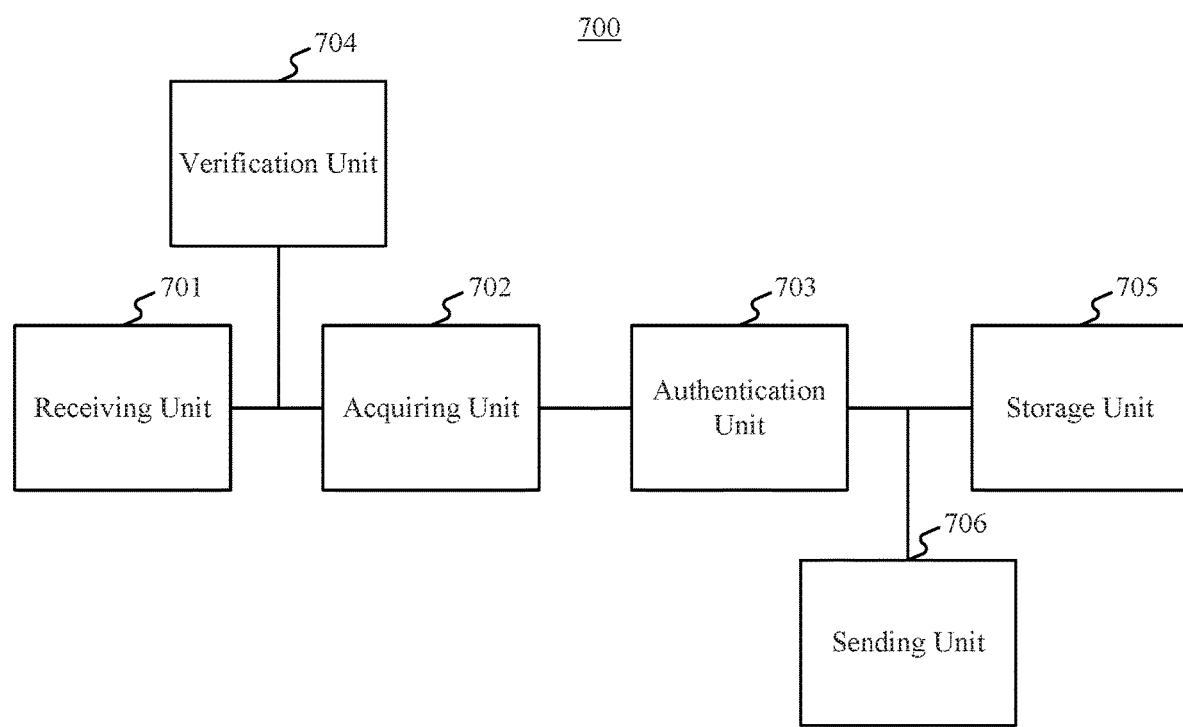
FIG. 7 is a schematic diagram of an authentication device according to an embodiment.

FIG. 7 is a schematic diagram of an authentication device 700 according to an embodiment. As shown in FIG. 7, the authentication device 700 includes a receiving unit 701, an acquiring unit 702, and an authentication unit 703.

The receiving unit 701 is configured to receive an authentication request sent from a user, where the authentication request includes an identity identifier of the user.

The acquiring unit 702 is configured to acquire authentication data associated with the identity identifier from a blockchain network, where a blockchain node of the blockchain network stores a mapping relationship between identity identifiers and authentication data.

The authentication unit 703 is configured to perform identity authentication for the user according to the authentication data.

In an embodiment, the authentication device 700 further includes a verification unit 704. The verification unit 704 is configured to, if the authentication request further includes a public key and a digital signature, verify whether the digital signature is valid by using the public key, wherein the digital signature is obtained using a private key in the public and private key pair.

The acquiring unit 702 acquiring authentication data associated with the identity identifier from a blockchain network includes: if the verification result indicates that the digital signature is valid, acquiring the authentication data associated with the identity identifier from the blockchain network.

In an embodiment, the acquiring unit 702 acquiring authentication data associated with the identity identifier from a blockchain network includes: obtaining the authentication data including the identity identifier from the blockchain network, and determining the obtained authentication data as the authentication data associated with the identity identifier.

In an embodiment, the acquiring unit 702 is configured to, if more than one piece of authentication data is obtained, select authentication data satisfying a preset condition from the obtained authentication data, and determine the selected authentication data as the authentication data associated with the identity identifier.

In an embodiment, the preset condition includes at least one of the following: a generation time of the authentication data satisfies a preset time condition; an institution identifier included in the authentication data satisfies a preset issuing institution's institution identifier; or a service type included in the authentication data is the same as a service type of a service initiated by the user.

In an embodiment, the authentication unit 703 performing identity authentication for the user according to the authentication data includes: determining a current authentication status of the identity identifier according to the authentication data; if the identity identifier is in an abnormal state and/or an authentication failed state, determining that the identity authentication for the user is not successful; and if the identity identifier is not in an abnormal state or an authentication failed state, determining that the identity authentication for the user is successful.

In an embodiment, the authentication device 700 further includes a storage unit 705. The storage unit 705 is configured to: generate authentication data according to the authentication result, where the authentication data includes the identity identifier of the user, an institution identifier of an institution that generates the authentication result, and the authentication result, and the authentication result includes authentication being successful/authentication failed; and store the authentication data to a blockchain node of the blockchain network.

In an embodiment, the authentication device 700 further includes a sending unit 706. The sending unit 706 is configured to, before the authentication data is stored to a blockchain node of the blockchain network, send the authentication data to the blockchain network, so that the blockchain network performs consensus processing on the authentication data.

The storage unit 705 storing the authentication data to a blockchain node of the blockchain network can include: if the consensus processing result indicates that a consensus is reached, storing the authentication data to a blockchain node of the blockchain network.

In an embodiment, the acquiring unit 702 is configured to: after it is determined that the identity authentication for the user is successful, acquire, according to the service type of the service requested by the user, identity feature information of the user associated with the service type from an identity information management server.

The storage unit 705 is configured to: generate authentication data according to the authentication result and the identity feature information, where the authentication data includes the identity identifier of the user, an institution identifier of an institution at generates the authentication result, an authentication event of authenticating the identity feature information, and the authentication result, and the authentication result includes authentication being successful/authentication failed; and store the authentication data to a blockchain node of the blockchain network.

It should be appreciated that the authentication device 700 may be implemented through software or hardware or a combination of software and hardware, which is not limited herein. After an authentication request sent from a user is received, the authentication device 700 can acquire authentication data associated with an identity identifier of the user from a blockchain network and perform identity authentication for the user according to the authentication data.

Based on the features such as decentralization and anti-tampering of the blockchain network, a mapping relationship between identity identifiers of different users and authentication data can be stored in advance in a blockchain node of the blockchain network. When providing a service for the user, an Internet service platform can perform identity authentication for the user based on the authentication data stored in the blockchain network. The technical solutions provided herein can avoid the problem of low efficiency in processing authentication requests due to the large number of identity authentication requests to be processed by the identity management platform, thus improving the processing efficiency of identity authentication. As the authentication data can be shared among different Internet service platforms by means of the blockchain network, the user does not need to submit identity information when registering with or logging in to a new service platform each time. Misuse of the identity information by an imposter due to leakage of the identity information can be effectively prevented, thus effectively improving the accuracy of identity authentication.

In an embodiment, an authentication device includes at least one memory and at least one processor. The at least one memory stores a program and the at least one processor is configured to execute the program to: receive an authentication request sent from a user, where the authentication request includes an identity identifier of the user; acquire authentication data associated with the identity identifier from a blockchain network, a blockchain node of the blockchain network storing a mapping relationship between identity identifiers and authentication data; and perform identity authentication for the user according to the authentication data.

For specific implementations, reference can be made to the contents described in the foregoing embodiments, and the details will not be repeated herein.

Figure 8:
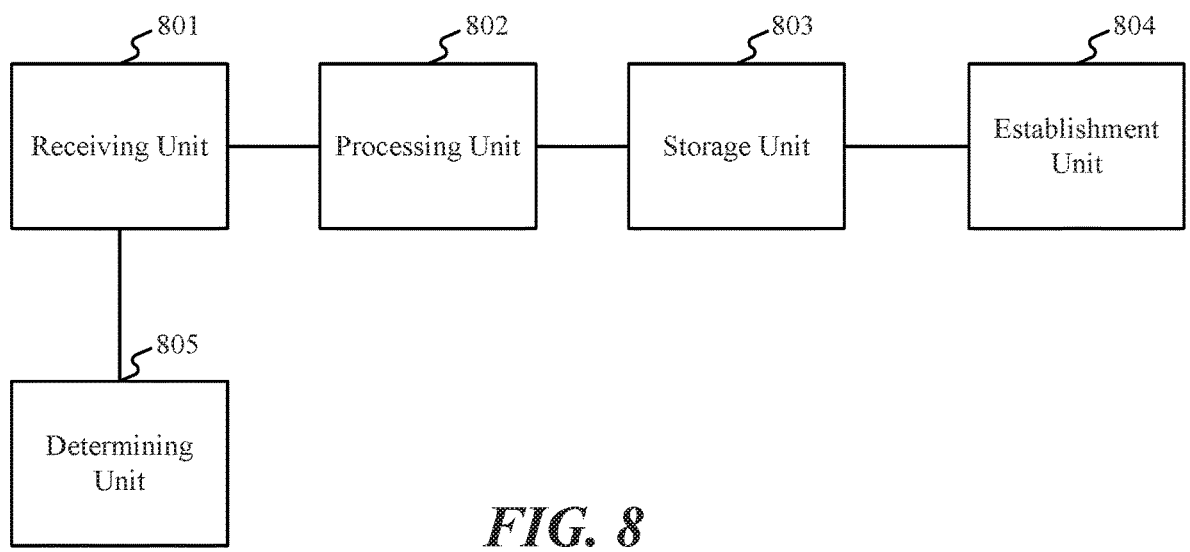
FIG. 8 is a schematic diagram of a blockchain-based authentication data processing device according to an embodiment

FIG. 8 is a schematic diagram of a blockchain-based authentication data processing device 800 according to an embodiment. As shown in FIG. 8, the authentication data processing device 800 includes a receiving unit 801, a processing unit 802, and a storage unit 803.

The receiving unit 801 is configured to receive identity information sent from a user, and authenticate the identity information.

The processing unit 802 is configured to generate first authentication data according to the authentication result, the first authentication data including the authentication result, an institution identifier of an institution that generates the authentication result, and an identity identifier of the user.

The storage unit 803 is configured to store the first authentication data to a blockchain node of a blockchain network.

In an embodiment, the authentication data processing device 800 further includes an establishment unit 804. The establishment unit 804 is configured to: establish a mapping relationship between the identity identifier of the user and identity information of the user, and store the identity information of the user to an identity information database according to the mapping relationship.

In an embodiment, the receiving unit 801 authenticating the identity information includes: verifying whether the identity information is valid. The processing unit 802 generating first authentication data according to the authentication result includes: when the verification result indicates that the identity information is valid, obtaining the first authentication data according to the authentication result, the institution identifier of the institution that generates the authentication result, and the identity identifier of the user.

In an embodiment, the authentication data processing device 800 further includes a determining unit 805. The receiving unit 801 is further configured to receive a loss report or unregistration request sent from the user, where the loss report or unregistration request includes the identity identifier of the user. The determining unit 805 is configured to determine, according to the loss report or unregistration request, that the identity information of the user is in an abnormal state.

The processing unit 802 is further configured to generate second authentication data according to the identity information of the user being in an abnormal state, the institution identifier of the institution that generates the authentication result, and the identity identifier of the user.

The storage unit 803 is further configured to store the second authentication data to a blockchain node of the blockchain network.

It is appreciated that the authentication data processing device 800 may be implemented through software or hardware or a combination of software and hardware, which is not limited herein.

Embodiments of the specification further provide blockchain-based authentication data processing devices. In one embodiment, a blockchain-based authentication data processing device includes at least one memory and at least one processor, wherein the at least one memory stores a program and the processor is configured to execute the following steps: receiving identity information sent from a user, and authenticating the identity information; generating first authentication data according to the authentication result, where the first authentication data includes the authentication result, an institution identifier of an institution that generates the authentication result, and an identity identifier of the user; and storing the first authentication data to a blockchain node of a blockchain network.

For specific implementations, reference can be made to the contents described in the foregoing embodiments, and the details will not be repeated herein.

Each of the above described methods and units may be implemented as software, or hardware, or a combination of software and hardware. For example, a Programmable Logic Device (PLD) (such as a Field Programmable Gate Array (FPGA)) is an integrated circuit, the logic functions of which can be programed by a user. Designers can integrate a digital system on a single PLD through programing, without requiring a chip manufacturer to design and fabricate a dedicated integrated circuit chip. Moreover, instead of manually making integrated circuit chips, programming can be implemented using logic compiler software, which is similar a software compiler used in programming development. The original codes before compiling can be written in a programming language, which can be referred to as Hardware Description Language (HDL). There may be different types of HDL, such as ABEL (Advanced Boolean Expression Language), AHDL (Altera Hardware Description Language), Confluence, CUPL (Cornell University Programming Language), HDCql, JHDL (Java Hardware Description Language), Lava, Lola, MyHDL, PALASM, RHDL (Ruby Hardware Description Language), etc. For example, commonly used HDLs include VHDL (Very-High-Speed Integrated Circuit Hardware Description Language) and Verilog. It is appreciated that method procedures described above can be programmed into an integrated circuit through logic programming using the above HDLs. A hardware circuit that implements the logic method procedures can be obtained.

Figure 9:
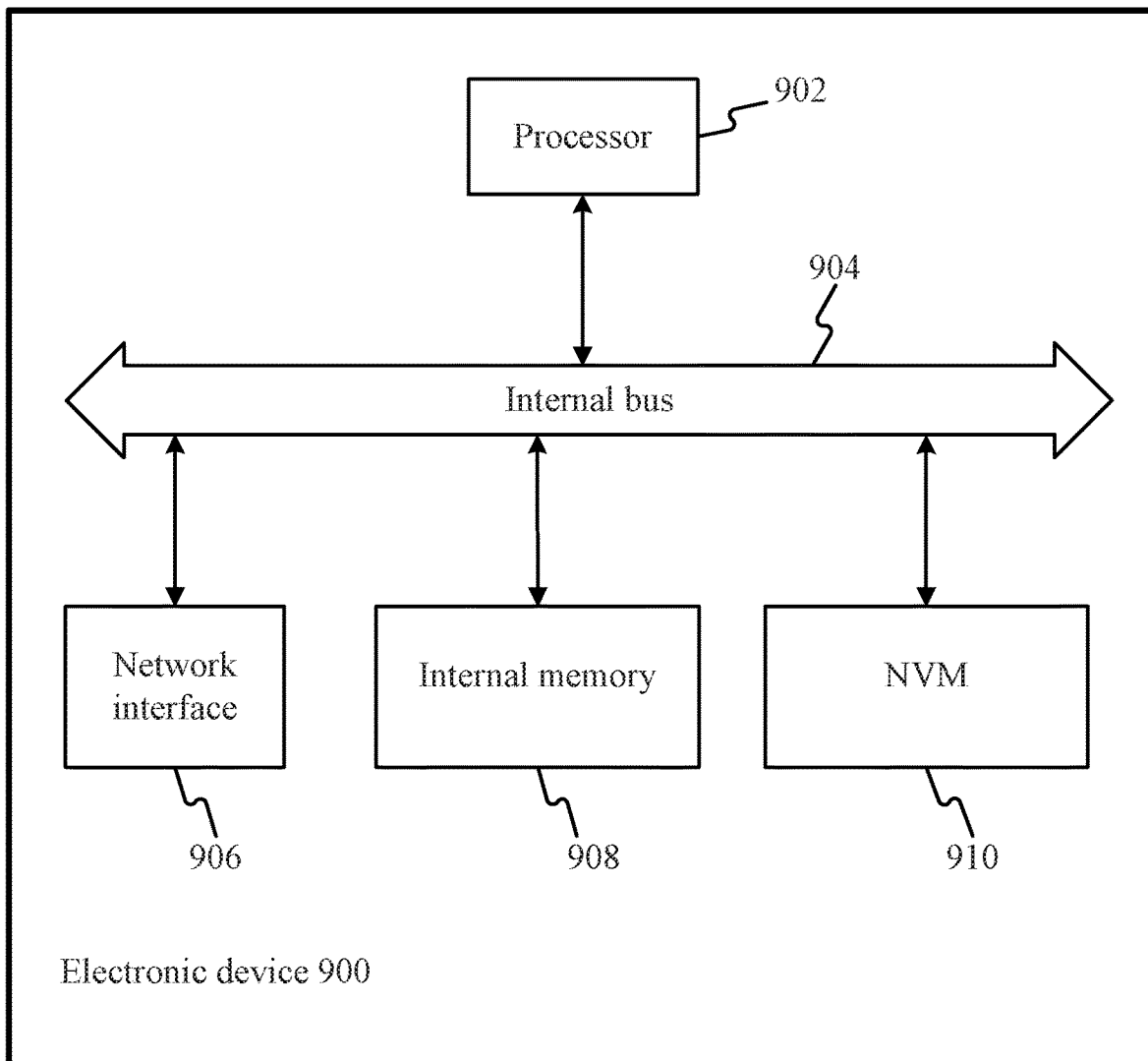
FIG. 9 is a schematic diagram of an electronic device according to an embodiment.

FIG. 9 is a schematic diagram of an electronic device 900 according to an embodiment. For example, the device 900 may be any of the authentication devices or blockchain-based authentication data processing devices described above. Referring to FIG. 9, the device 900 includes a processor 902, an internal bus 904, a network interface 906, and a memory such as an internal memory 908 and a nonvolatile memory (NVM) 910. The processor 902 is configured to execute instructions stored in the memory for performing the above described methods.

A controller may be implemented in any suitable manner in the above-described devices. For example, the controller may be in the form of, for example, a microprocessor or a processor and a computer readable medium storing a computer readable program code (for example, software or firmware) executable by the (micro)processor, a logic gate, a switch, an Application Specific Integrated Circuit (ASIC), a programmable logic controller, and an embedded micro-controller. Examples of the controller include, but are not limited to, the following micro-controllers: ARC 625D, Atmel AT91SAM, Microchip PIC18F26K20, and Silicone Labs C8051F320. A memory controller may also be implemented as a part of the control logic of a memory. Those skilled in the art will also appreciate that the controller may be implemented by using pure computer readable program codes, and in addition, the method steps may be logically programmed to enable the controller to implement the same functions in a form of a logic gate, a switch, an application-specific integrated circuit, a programmable logic controller and an embedded microcontroller. Therefore, this type of controller may be considered as a hardware component, and apparatuses included therein for implementing various functions may also be considered as structures inside the hardware component. Alternatively, the devices used for implementing various functions may be considered as software modules for implementing the methods and structures inside the hardware component.

The systems, devices, modules, or units illustrated in the above embodiments may be specifically implemented by using a computer chip or an entity, or a product having a certain function. For example, the implementation device can be a computer. The computer be, for example, a personal computer, a laptop computer, a cellular phone, a camera phone, a smart phone, a personal digital assistant, a media player, a navigation device, an email device, a game console, a tablet computer, a wearable device, or a combination of any of these devices.

For the convenience of description, the above devices are described in various units divided by functions. The units may be divided in a different manner. The functions of the various units may also be implemented in one or more pieces of software and/or hardware in the implementation of embodiments of the specification.

Those skilled in the art will appreciate that some embodiments may be provided as a method, a system, or a computer program product. For example, some embodiments provided herein can take the form of an entirely hardware embodiment, an entirely software embodiment or an embodiment combining software and hardware aspects. Furthermore, some embodiments may take the form of a computer program product implemented by one or more computer-readable storage media (including but not limited to magnetic disk memories, CD-ROMs, optical memories, etc.) including computer-usable program codes.

Some embodiments are described with reference to flowcharts and/or block diagrams of the methods, devices (systems) and computer products. It is appreciated that computer program instructions can implement each process and/or block in the flowcharts and/or block diagrams and a combination of processes and/or blocks in the flowcharts and/or block diagrams. These computer program instructions may be provided to a general-purpose computer, a special-purpose computer, an embedded processor, or a processor of another programmable data processing device to generate a machine. The functions associated with one or more processes in the flowcharts and/or one or more blocks in the block diagrams can be implemented by a processor of the computer or the processor of another programmable data processing device.

These computer program instructions may also be stored in a computer readable memory that can guide a computer or another programmable data processing device to work in a specified manner, so that the instructions stored in the computer readable memory generate a product including an instruction device. The instruction device can implement functions associated with one or more processes in the flowcharts and/or one or more blocks in the block diagrams.

These computer program instructions may also be loaded into a computer or another programmable data processing device, so that a series of operation steps are performed on the computer or another programmable data processing device. For example, the instructions executed on the computer or another programmable data processing device provide procedures for implementing functions associated with one or more processes in the flowcharts and/or one or more blocks in the block diagrams.

The computer readable storage medium can include permanent and non-permanent, as well as mobile and non-mobile media, and may implement information storage using various methods. The information may be computer-readable instructions, data structures, modules of a program, or other data. Examples of computer-readable storage medium can include, but are not limited to, a phase change memory (PRAM), a static random access memory (SRAM), a dynamic random access memory (DRAM), other types of RAMS, a ROM, an electrically erasable programmable read-only memory (EEPROM), a flash memory or other memory technologies, a compact disk read-only memory (CD-ROM), a digital versatile disc (DVD) or other optical storage, a cassette tape, a tape disk storage or other magnetic storage devices, or any other non-transmission media, which can be used for storing computer accessible information. The computer readable medium may not include transitory computer readable media (transitory media), for example, a modulated data signal and carrier.

It is appreciated that the terms that the terms "include" or "comprise" or any other variations used herein may encompass a non-exclusive inclusion. A process, method, product, or device including a series of elements can include not only those listed elements, but also other elements that are not explicitly listed, or elements that are inherent to such a process, method, product, or device. An element defined by the phrase "including a . . . ," without further limitation, does not exclude the presence of additional identical elements in the process, the method, the article, or the device including the element.

The above described methods can be implemented by instructions executed by a computer, such as program modules. Generally, the program modules can include routines, programs, objects, components, data structures, and the like that can be used for executing a particular task or implementing a particular data type. The above described methods may also be implemented in distributed computing environments, where tasks are executed by using remote processing devices connected through a communications network. In a distributed computer environment, program modules may be located in both local and remote computer storage media.

Various embodiments of the specification are described above. Reference can be made to identical or similar parts described with respect to different embodiments. Further, description of one embodiment may focus on differences from some other embodiments. For example, for the system embodiments, as the procedures performed therein may be similar to the method embodiments, reference can be made to the detailed description provided with respect to the method embodiments.

The above description provides only exemplary embodiments of the specification and is not intended to limit the specification. Various changes and modifications can be made to the embodiments by those skilled in the art, consistent with the specification. Any modifications, equivalent substitutions, improvements, etc. made within the spirit and scope of the specification shall all fall within the scope defined in the appended claims.

The invention claimed is:

1. An authentication method, comprising: receiving an authentication request from a user, the authentication request including an identity identifier of the user;
   acquiring first authentication data associated with the identity identifier from a blockchain network, a blockchain node of the blockchain network storing identity identifiers, respective authentication data of the identity identifiers, and a mapping relationship between the identity identifiers and the respective authentication data, the respective authentication data stored on the blockchain node including at least one authentication result indicating failed authentication, and the first authentication data including an authentication result indicating successful or failed authentication; and
   performing identity authentication for the user according to the first authentication data acquired from the blockchain network and storing new authentication data on the blockchain node, wherein performing the identity authentication comprises:
      determining an authentication status of the identity identifier based on the first authentication data acquired from the blockchain network;
      in response to the identity identifier being in an abnormal state or an authentication failed state, determining that the identity authentication for the user is not successful; and
      in response to the identity identifier not being in an abnormal state or an authentication failed state, determining that the identity authentication for the user is successful.

2. The authentication method according to claim 1, further comprising:
   in response to the authentication request including a public key and a digital signature, verifying whether the digital signature is valid using the public key; and
   the acquiring the first authentication data associated with the identity identifier from the blockchain network comprises:
      in response to a verification result indicating that the digital signature is valid, acquiring the first authentication data associated with the identity identifier from the blockchain network.

3. The authentication method according to claim 1, wherein the acquiring the first authentication data associated with the identity identifier from the blockchain network comprises:
   obtaining authentication data including the identity identifier from the blockchain network; and
   determining the obtained authentication data as the first authentication data associated with the identity identifier.

4. The authentication method according to claim 3, further comprising:
   in response to the obtained authentication data including a plurality of pieces of authentication data, selecting, from the obtained authentication data, a piece of authentication data satisfying a preset condition; and
   determining the selected piece of authentication data as the first authentication data associated with the identity identifier.

5. The authentication method according to claim 4, wherein the preset condition comprises at least one of:
   a generation time associated with the selected piece of authentication data satisfies a preset time condition;
   an institution identifier associated with the selected piece of authentication data satisfies a preset issuing institution's institution identifier; or
   a service type associated with the selected piece of authentication data matches a service type of a service initiated by the user.

6. The authentication method according to claim 1, further comprising:
   generating the first authentication data according to the authentication result, the first authentication data including the identity identifier of the user, an institution identifier of an institution that generates the authentication result, and the authentication result; and
   storing the first authentication data to the blockchain node of the blockchain network.

7. The authentication method according to claim 6, wherein the storing the first authentication data to the blockchain node of the blockchain network comprises:
   sending the first authentication data to the blockchain network for consensus processing; and
   in response to a consensus being reached, storing the first authentication data to the blockchain node of the blockchain network.

8. The authentication method according to claim 1, wherein after the determining that the identity authentication for the user is successful, the method further comprises:
   acquiring, according to a service type of a service requested by the user, identity feature information of the user associated with the service type from an identity information management server;
   generating second authentication data according to an authentication result and the identity feature information, the second authentication data including the identity identifier of the user, an institution identifier of an institution that generates the authentication result, an authentication event of authenticating the identity feature information, and the authentication result; and
   storing the second authentication data to the blockchain node of the blockchain network.

9. An authentication device, comprising:
   a memory storing instructions; and
   at least one processor configured to execute the instructions to:

receive an authentication request from a user, the authentication request including an identity identifier of the user;

acquire first authentication data associated with the identity identifier from a blockchain network, a blockchain node of the blockchain network storing identity identifiers, respective authentication data of the identity identifiers, and a mapping relationship between the identity identifiers and the respective authentication data, the respective authentication data stored on the blockchain node including at least one authentication result indicating failed authentication, and the first authentication data including an authentication result indicating successful or failed authentication; and perform identity authentication for the user according to the first authentication data acquired from the blockchain network and store new authentication data on the blockchain node, wherein performing the identity authentication comprises:

determining an authentication status of the identity identifier based on the first authentication data acquired from the blockchain network;

in response to the identity identifier being in an abnormal state or an authentication failed state, determining that the identity authentication for the user is not successful; and in response to the identity identifier not being in an abnormal state or an authentication failed state, determining that the identity authentication for the user is successful.

10. The authentication device according to claim 9, wherein the at least one processor is further configured to execute the instructions to:

if the authentication request includes a public key and a digital signature, verify whether the digital signature is valid by using the public key;

wherein acquiring the first authentication data associated with the identity identifier from the blockchain network comprises:

if a verification result indicates that the digital signature is valid, acquiring the first authentication data associated with the identity identifier from the blockchain network.

11. The authentication device according to claim 9, wherein in acquiring the first authentication data associated with the identity identifier from the blockchain network, the at least one processor is further configured to execute the instructions to:

obtain authentication data including the identity identifier from the blockchain network; and determine the obtained authentication data as the first authentication data associated with the identity identifier.

12. A non-transitory computer readable medium storing a set of instructions that, when executed by a processor of a device, cause the device to perform an authentication method, the method comprising:

receiving an authentication request from a user, the authentication request including an identity identifier of the user;

acquiring first authentication data associated with the identity identifier from a blockchain network, a blockchain node of the blockchain network storing identity identifiers, respective authentication data of the identity identifiers, and a mapping relationship between the identity identifiers and the respective authentication data, the respective authentication data stored on the blockchain node including at least one authentication result indicating failed authentication, and the first authentication data including an authentication result indicating successful or failed authentication; and performing identity authentication for the user according to the first authentication data acquired from the blockchain network and storing new authentication data on the blockchain node, wherein performing the identity authentication comprises:

determining an authentication status of the identity identifier based on the first authentication data acquired from the blockchain network;

in response to the identity identifier being in an abnormal state or an authentication failed state, determining that the identity authentication for the user is not successful; and in response to the identity identifier not being in an abnormal state or an authentication failed state, determining that the identity authentication for the user is successful.

13. The authentication device according to claim 11, wherein the at least one processor is further configured to execute the instructions to:

in response to the obtained authentication data including a plurality of pieces of authentication data, select, from the obtained authentication data, a piece of authentication data satisfying a preset condition; and determine the selected piece of authentication data as the first authentication data associated with the identity identifier.

14. The authentication device according to claim 13, wherein the preset condition comprises at least one of:

a generation time associated with the selected piece of authentication data satisfies a preset time condition;

an institution identifier associated with the selected piece of authentication data satisfies a preset issuing institution's institution identifier; or a service type associated with the selected piece of authentication data matches a service type of a service initiated by the user.

15. The authentication device according to claim 9, wherein the at least one processor is further configured to execute the instructions to:

generate the first authentication data according to the authentication result, the first authentication data including the identity identifier of the user, an institution identifier of an institution that generates the authentication result, and the authentication result; and store the first authentication data to the blockchain node of the blockchain network.

16. The authentication device according to claim 15, wherein in storing the first authentication data to the blockchain node of the blockchain network, the at least one processor is further configured to execute the instructions to:

send the first authentication data to the blockchain network for consensus processing; and in response to a consensus being reached, store the first authentication data to the blockchain node of the blockchain network.

17. The authentication device according to claim 9, wherein after the determining that the identity authentication for the user is successful, the at least one processor is further configured to execute the instructions to:

acquire, according to a service type of a service requested by the user, identity feature information of the user associated with the service type from an identity information management server;

generate second authentication data according to an authentication result and the identity feature information, the second authentication data including the identity identifier of the user, an institution identifier of an institution that generates the authentication result, an authentication event of authenticating the identity feature information, and the authentication result; and store the second authentication data to the blockchain node of the blockchain network.

* * * * *